(12) United States Patent
Wille

(10) Patent No.: US 10,853,520 B2
(45) Date of Patent: Dec. 1, 2020

(54) DATA PROCESSING DEVICE, METHOD FOR EXECUTING AN APPLICATION AND COMPUTER PROGRAM PRODUCT

(71) Applicant: NXP B.V., Eindhoven (NL)

(72) Inventor: Thomas E. F. Wille, Hamburg (DE)

(73) Assignee: NXP B.V., Eindhoven (NL)

(*) Notice: Subject to any disclaimer, the term of this patent is extended or adjusted under 35 U.S.C. 154(b) by 522 days.

(21) Appl. No.: 14/596,165

(22) Filed: Jan. 13, 2015

(65) Prior Publication Data

US 2015/0199509 A1 Jul. 16, 2015

(30) Foreign Application Priority Data

Jan. 13, 2014 (EP) ..................................... 14150876

(51) Int. Cl.
| | |
|---|---|
| *G06F 21/62* | (2013.01) |
| *G06Q 20/32* | (2012.01) |
| *G06F 21/53* | (2013.01) |
| *G06F 21/74* | (2013.01) |

(52) U.S. Cl.
CPC ............ *G06F 21/629* (2013.01); *G06F 21/53* (2013.01); *G06F 21/74* (2013.01); *G06Q 20/3227* (2013.01); *G06F 2221/031* (2013.01); *G06F 2221/032* (2013.01)

(58) Field of Classification Search
CPC ......... G06F 21/53; G06F 21/74; G06F 21/629
USPC ............................................................ 726/16
See application file for complete search history.

(56) References Cited

U.S. PATENT DOCUMENTS

| 5,432,934 | A | * | 7/1995 | Levin | ..................... | G06F 9/4443 726/16 |
| 7,003,676 | B1 | * | 2/2006 | Weber | ..................... | G06F 21/74 713/172 |
| 2001/0039190 | A1 | * | 11/2001 | Bhatnagar | ............. | D06F 39/005 455/450 |
| 2002/0099455 | A1 | * | 7/2002 | Ward | ..................... | G05B 19/07 700/83 |

(Continued)

FOREIGN PATENT DOCUMENTS

| CN | 1882896 | 12/2006 |
| CN | 103377349 | 10/2013 |

(Continued)

OTHER PUBLICATIONS

Extended European Search Report for Patent Appln. No. 14150876.2 (dated May 27, 2014).

(Continued)

*Primary Examiner* — Teshome Hailu

(57) ABSTRACT

There is disclosed a data processing device for executing an application, the data processing device comprising a processing unit for controlling access to at least one user interface comprised in the data processing device, and a secure element for facilitating secure execution of the application, wherein executing the application comprises receiving input data from and/or sending output data to the user interface, and wherein the secure element is arranged to cause the processing unit to restrict the access to the user interface during execution of the application. Furthermore, a corresponding method for executing an application and a corresponding computer program product are disclosed.

13 Claims, 3 Drawing Sheets

(56) References Cited

U.S. PATENT DOCUMENTS

| | | | |
|---|---|---|---|
| 2003/0041248 A1* | 2/2003 | Weber | G06F 21/575 713/182 |
| 2003/0204560 A1* | 10/2003 | Chen | G05B 19/05 709/203 |
| 2005/0210280 A1* | 9/2005 | Paatero | G06F 21/74 726/22 |
| 2006/0195907 A1* | 8/2006 | Delfs | G06F 21/74 726/26 |
| 2007/0143448 A1* | 6/2007 | Yi | G06F 17/30876 709/219 |
| 2008/0034406 A1* | 2/2008 | Ginter | G06F 21/10 726/2 |
| 2008/0280636 A1* | 11/2008 | Kim | H04M 1/7253 455/515 |
| 2009/0055637 A1* | 2/2009 | Holm | G06F 21/575 713/1 |
| 2009/0265638 A1* | 10/2009 | Carapelli | G06F 15/173 715/741 |
| 2013/0275306 A1 | 10/2013 | Ignatchenko et al. | |
| 2014/0013406 A1 | 1/2014 | Tremlet | |
| 2014/0082373 A1 | 3/2014 | Colnot | |
| 2014/0095387 A1 | 4/2014 | Colnot | |
| 2014/0095388 A1 | 4/2014 | Colnot | |
| 2014/0096222 A1 | 4/2014 | Colnot | |
| 2014/0172700 A1 | 6/2014 | Teuwen et al. | |

FOREIGN PATENT DOCUMENTS

| | | |
|---|---|---|
| EP | 2 192 520 A1 | 6/2010 |
| GB | 2 421 610 A | 6/2006 |

OTHER PUBLICATIONS

"Building a Secure System Using TrustZone Technology", ARM, 108 pgs, retrieved from the internet at: http://infocenter.arm.com/help/topic/com.arm.doc.prd29-genc-009492c/PRD29-GENC-009492C_trustzone_security_whitepaper.pdf. (2009).

Vasudevan, A. et al. "Trustworthy Execution on Mobile Devices: What Security Properties can my Mobile Platform give me?", Carnegie Mellon University, 17 pgs, retrieved from the internet at: repository.cmu.edu/cgi/viewcontent.cgi?article=1096&context=cylab (Nov. 2011).

\* cited by examiner

DATA PROCESSING DEVICE, METHOD FOR EXECUTING AN APPLICATION AND COMPUTER PROGRAM PRODUCT

CROSS-REFERENCE TO RELATED APPLICATIONS

This application claims the priority under 35 U.S.C. § 119 of European patent application no. 14150876.2, filed on Jan. 13, 2014, the contents of which are incorporated by reference herein.

FIELD

The present disclosure relates to a data processing device for executing an application. Furthermore, the present disclosure relates to a method for executing an application in a data processing device. Furthermore, the present disclosure relates to a corresponding computer program product.

BACKGROUND

Today, security plays an important role in many electronic devices and computing environments. For example, conventional mobile electronic devices may be used for payment transactions which require that sensitive payment-related data, such as user credentials, are input and/or stored on said devices. Such mobile electronic devices may for instance be equipped with a near field communication (NFC) interface based on radio frequency (RF) technology, in order to exchange payment-related data with a terminal device at a point-of-sale (POS).

Traditionally, sensitive payment-related data have been incorporated into dedicated security tokens such as smart cards, in which the data are inherently confined to a relatively trusted environment. However, with the advent of integrated solutions, in particular the integration of so-called secure elements (SE's) in mobile devices, payment-related data are often exposed to a potentially hostile environment, and therefore the confidentiality of these data may be at stake.

A secure element is often implemented as an embedded chip, more specifically as a tamper-resistant integrated circuit with stalled smart-card-grade applications, for instance payment applications, which have a prescribed functionality and a prescribed level of security. Examples of such secure elements are the integrated circuits of the so-called SmartMX™ or SmartMX2™ series of IC's produced by NXP Semiconductors. Alternatively, so-called Subscriber Identity Modules (SIM's) or Universal Subscriber Identity Modules (USIM's) may be used as secure elements. Furthermore, secure digital (SD) cards, such as traditional SD cards or micro-SD cards, may be used as secure elements. A secure element may be embedded in a mobile device or another host device, for example as a small outline package soldered directly on a printed circuit board. Alternatively, a secure element may be comprised in said mobile device as a removable component (e.g. a SIM or an SD card).

Although a secure element offers a relatively secure environment for executing applications, the execution of these applications typically requires that user input data, e.g. a personal identification number (PIN) or transaction confirmation data, are fed to the secure element via a user interface of a host device, e.g. via a physical or virtual keypad of a mobile phone in which the secure element is embedded. Furthermore, the execution of these applications may require that output data are presented to a user via a user interface of said host device, e.g. a display. It is evident that both the input data and the output data must remain secret, because these data may be sensitive in nature. However, since the user interface is typically driven by a central processing unit of the host device, these input data and output data may be acquired and manipulated relatively easily by an attacker.

Nowadays high-end mobile device architectures are advanced, compact computer systems which normally contain an application processor and a baseband processor. The baseband processor (or modem processor) controls radio interfaces such GSM, GPS, Bluetooth and Wi-Fi interfaces. The application processor is the main or central processing unit of the mobile device, which executes many different applications. This implies that the input data for the secure element and output data from the secure element may be exposed to many different components and processes of the mobile device.

FIG. 1 shows a conventional data processing device, for example a mobile device, of the kind set forth. The data processing device 100 comprises a main or central processing unit 102, a secure element 104, a user output interface 106, and a user input interface 108. In operation, the processing unit 102 may execute applications and rely on the secure element 104 for certain functions, such as verifying user credentials and performing cryptographic operations. Alternatively, the secure element 104 may securely execute specific applications, such as the above-mentioned payment applications, instead of the central processing unit 102. In other words, for applications that require a high level of security, the secure element 104 may take the role of the central processing unit 102 insofar as the execution of the applications is concerned. However, as can be seen in FIG. 1, the secure element 104 may still require input data captured by the user input interface 108. Furthermore, the secure element 104 may still need to present output data to a user via the user output interface 106. Unfortunately, the user input interface 108 and user output interface 106 are driven by the central processing unit 102, which is exposed to many other components and processes of the data processing device 100. This poses a security threat to the executed applications.

In order to adequately protect payment transactions, dedicated standards have been developed by service providers (e.g. EuroCard, MasterCard and Visa) for both credit cards and debit cards. These cards, and thus the transactions executed with them, are typically protected by user credentials authorized or unlocked by a 4-digit secret PIN. The secret PIN must be protected against any attack; otherwise an attacker, who is able to acquire said PIN and other user data, may be able to execute transactions in the name of the user. Nowadays, transactions are normally carried out via so-called trusted terminals, so that the user may rely on the correct functioning of the display and the keyboard without fearing that, for example, a Trojan-horse attack reveals the user's input on the keyboard and/or manipulates the display during a transaction.

In mobile phone architectures several attempts have been made to provide a reasonably good security level for transactions of the kind set forth. For example, the so-called ARM TrustZone offers a mechanism for isolating a so-called secure world within a computing architecture, i.e. a secure sub-environment supported by hardware features. The ARM TrustZone mechanism has been described in "ARM Security Technology: Building a Secure System using TrustZone® Technology", published by ARM Limited, ©2005-2009, document number PRD29-GENC-009492C. However, the ARM TrustZone mechanism requires context switching between the secure world and the non-secure world, and since the switch mechanism itself is at least partly controlled by elements of the non-secure world, attack points are offered to the whole system. Furthermore, mobile phones are vulnerable to so-called jail-break attacks which allow updating the complete Flash memory of the mobile phones by the attacker. Therefore, today's mobile phone platforms must still be regarded as relatively insecure.

As mentioned above, secure elements which are introduced into the mobile phone architecture, for example in combination with NFC technology, provide a relatively high level of security for storing and processing user credentials and keys, and thus they may be regarded as a trust anchor or root-of-trust in any such architecture. However, the trust-anchor feature of a secure element in current implementations cannot be fully exploited, because the secure element is to a certain extent still used as a slave device from an application perspective. Another strong feature of a secure element is its capability to establish an end-to-end secure channel for any application for which the required keys have been pre-installed on the secure element in a secure environment.

In view of the above, it is desirable to further increase the security of electronic devices and computing environments in which secure elements are used to facilitate the secure execution of applications. More specifically, it is desirable to better exploit the capabilities of secure elements in these electronic devices and computing environments.

SUMMARY

There is disclosed a data processing device for executing an application, the data processing device comprising a processing unit for controlling access to at least one user interface comprised in the data processing device, and a secure element for facilitating secure execution of the application, wherein executing the application comprises receiving input data from and/or sending output data to the user interface, and wherein the secure element is arranged to cause the processing unit to restrict the access to the user interface during execution of the application.

According to an illustrative embodiment of the data processing device, restricting the access to the user interface comprises restricting the access to the user interface to instructions comprised in said application.

According to a further illustrative embodiment of the data processing device, the access to the user interface is restricted to the instructions comprised in said application by setting at least one control register in the processing unit to a value indicative of a secure access mode.

According to a further illustrative embodiment of the data processing device, the control register is comprised in an application controller of the processing unit.

According to a further illustrative embodiment of the data processing device, the secure element comprises an integrated circuit in which the application has been installed.

According to a further illustrative embodiment of the data processing device, the secure element is further arranged to cause the processing unit to revoke the restriction of the access after the application has been executed.

According to a further illustrative embodiment of the data processing device, the processing unit provides user interface access control by means of at least one of hardware and a control program installed in the processing unit, and wherein the secure element is further arranged to verify the integrity of the user interface access control.

According to a further illustrative embodiment of the data processing device, the secure element is further arranged to load a user interface access control program into the processing unit.

According to a further illustrative embodiment of the data processing device, the secure element is integrated into the processing unit.

Furthermore, there is disclosed a method for executing an application in a data processing device, the data processing device comprising a processing unit for controlling access to at least one user interface comprised in the data processing device, and a secure element for facilitating secure execution of the application, the method comprising the secure element causing the processing unit to restrict the access to the user interface during execution of the application, and receiving input data from and/or sending output data to the user interface.

According to an illustrative embodiment of the method, restricting the access to the user interface comprises restricting the access to the user interface to instructions comprised in said application.

According to a further illustrative embodiment of the method, the access to the user interface is restricted to the instructions comprised in said application by setting at least one control register in the processing unit to a value indicative of a secure access mode.

According to a further illustrative embodiment of the method, the secure element further causes the processing unit to revoke the restriction of the access after the application has been executed.

According to a further illustrative embodiment of the method, the processing unit provides user interface access control by means of at least one of hardware and a control program installed in the processing unit, and wherein the secure element further verifies the integrity of the user interface access control.

Furthermore, there is disclosed a computer program product comprising program elements executable by a processing unit or a secure element, wherein each program element comprises program instructions which, when being executed by the processing unit or the secure element, cause said processing unit and secure element to carry out or control respective steps of a method of the kind set forth.

DESCRIPTION OF DRAWINGS

Embodiments will be described in more detail with reference to the appended drawings, in which.

DESCRIPTION OF EMBODIMENTS

In accordance with the present disclosure, a data processing device, e.g. a mobile phone, for executing an application is provided. This data processing device comprises a processing unit for controlling access to at least one user interface comprised in the data processing device, and a secure element for facilitating secure execution of the application. The application may, for example, be executed by the secure element, but the secure element may have to rely on the processing unit to handle the input to and the output of the application. Alternatively, the processing unit may execute the application, but the processing unit may have to rely on the secure element for certain functions, for example for comparing input data with user credentials stored in the secure element or for cryptographic functions based on keys stored in the secure element. In either case, executing the application comprises receiving input data from and/or sending output data to the user interface. Furthermore, the secure element is arranged to cause the processing unit to restrict the access to the user interface during execution of the application. In this way, the secure element's intrinsic capability to establish an end-to-end secure channel may be better exploited, and consequently it may be that the application may be executed more securely.

Figure 1:
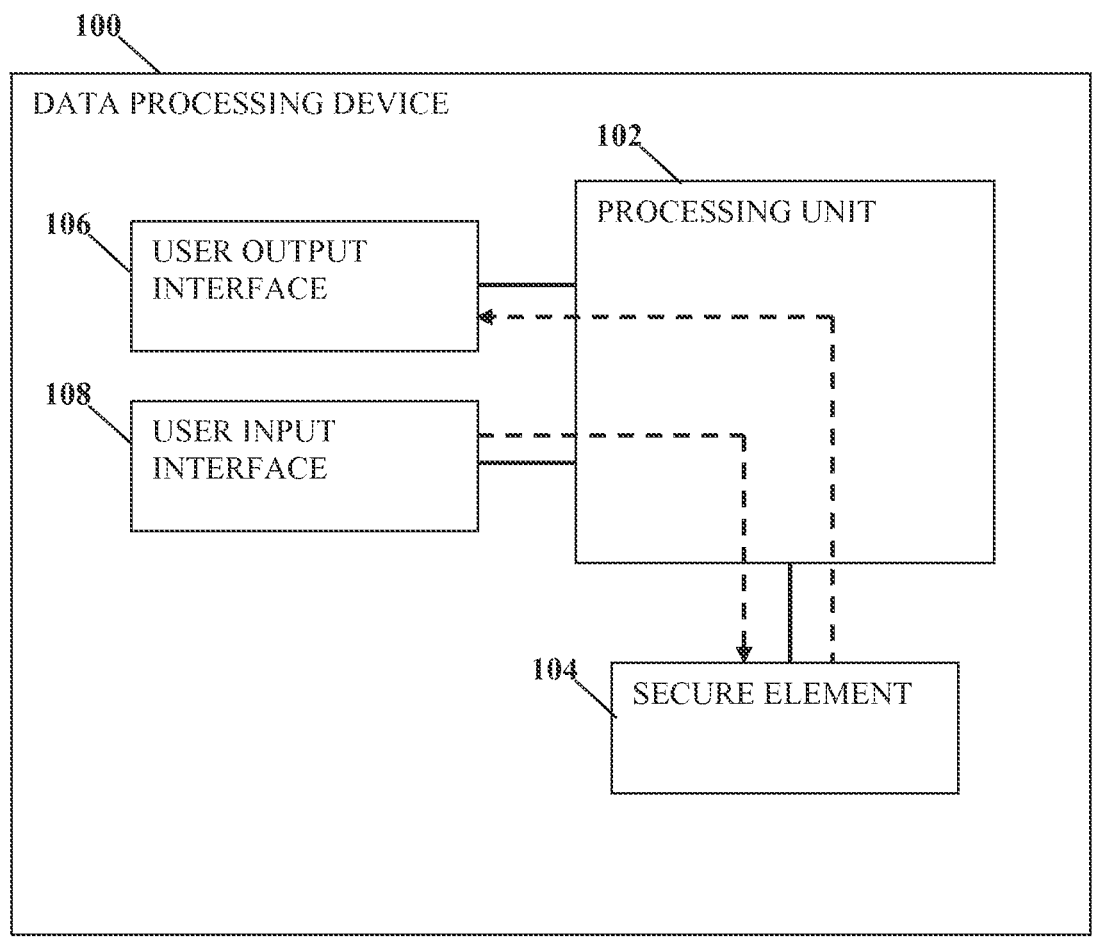
FIG. 1 shows a conventional data processing device.
Figure 2:
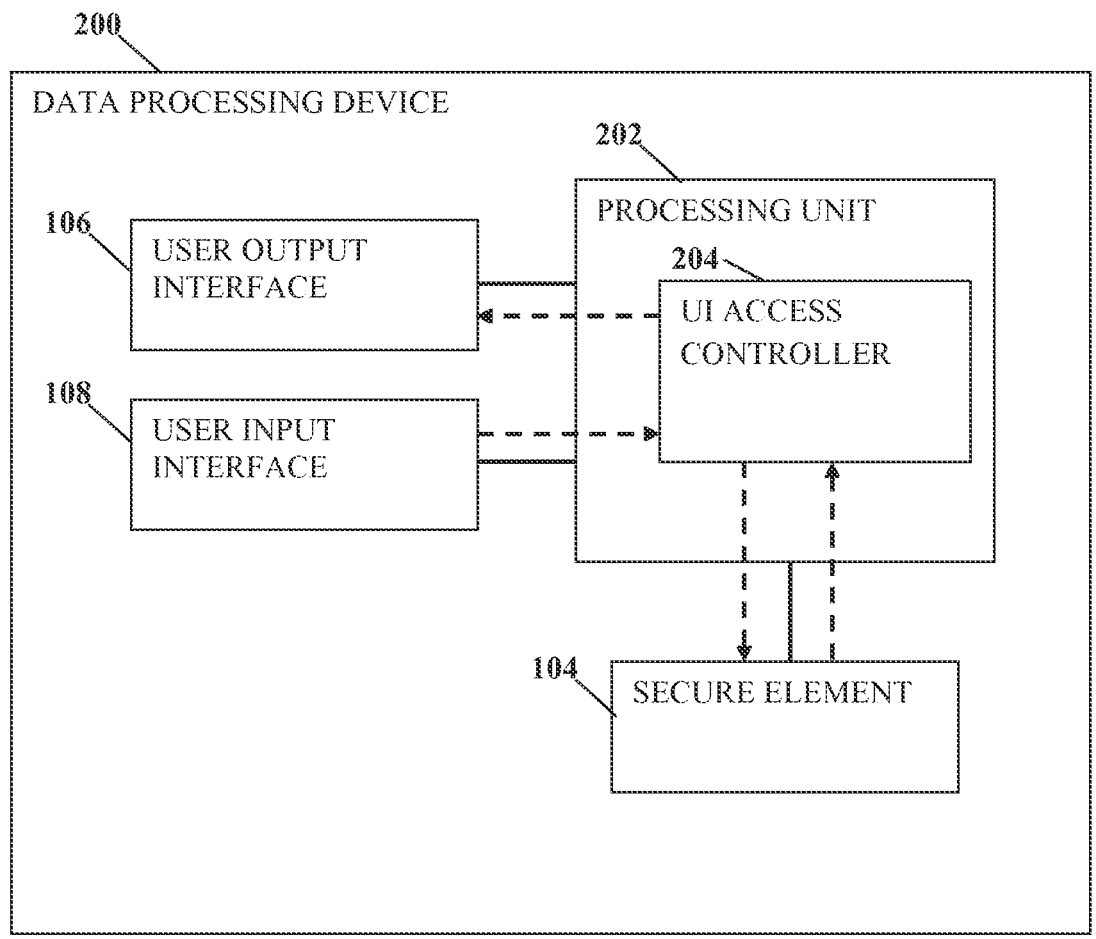
FIG. 2 shows an illustrative embodiment of a data processing device.

FIG. 2 shows an illustrative embodiment of a data processing device. The data processing device 200 comprises the secure element 104, the user output interface 106 and the user input interface 108 as shown in FIG. 1. Furthermore, the data processing device 200 comprises a processing unit 202 which includes a user interface access controller 204 which controls the access to the user output interface 106 and the user input interface 108. The user interface access controller 200 may, for example, be implemented using the above-mentioned ARM TrustZone technology. The TrustZone mechanism may then assure that the input/output channels reside in the so-called secure world within the computing environment. The skilled person will appreciate that the manner in which the TrustZone mechanism provides this assurance is known as such. Thus, a restricted access to the user interface is realized during execution of the application. More specifically, the access to the user interface may be restricted to instructions comprised in said application. Thus, no other applications may use the input/output channels within the computing environment during the execution of said application. Thereby, the risk that input data and/or output data are compromised may be further reduced. It is noted that the execution of the application may be performed in a time-sliced manner. In that case, in accordance with the present disclosure, it may be realized either that no other applications may use the input/output channels during the entire period in which the application is open, or that no other applications may use the input/output channels only during the time slots in which the application is being executed.

In accordance with the present disclosure, the secure element 104 may control the user interface access controller 204 in such a way that the latter activates a secure access mode in which said restricted access is enabled. For example, the user interface access controller 204 may contain a control register whose value may be set, by the secure element 104, to a value indicative of the secure access mode. The user interface access controller 204 then enables the restricted access to the user interfaces by means of techniques which are known as such, for example by means of the above-mentioned TrustZone mechanism. It is noted that the user interface access controller 204 does not need to be implemented as a separate entity within the processing unit; it may also consist of a designated set of software and/or hardware resources, e.g. a part of an ARM Trustzone allocated to the processing of user input and/or output. Furthermore, it is noted that, although the secure element 104 has been shown in FIG. 2 as being external to the processing unit 202, the secure element 104 may also be integrated into the processing unit 202. In this way, a more economic design may be achieved.

Figure 3:
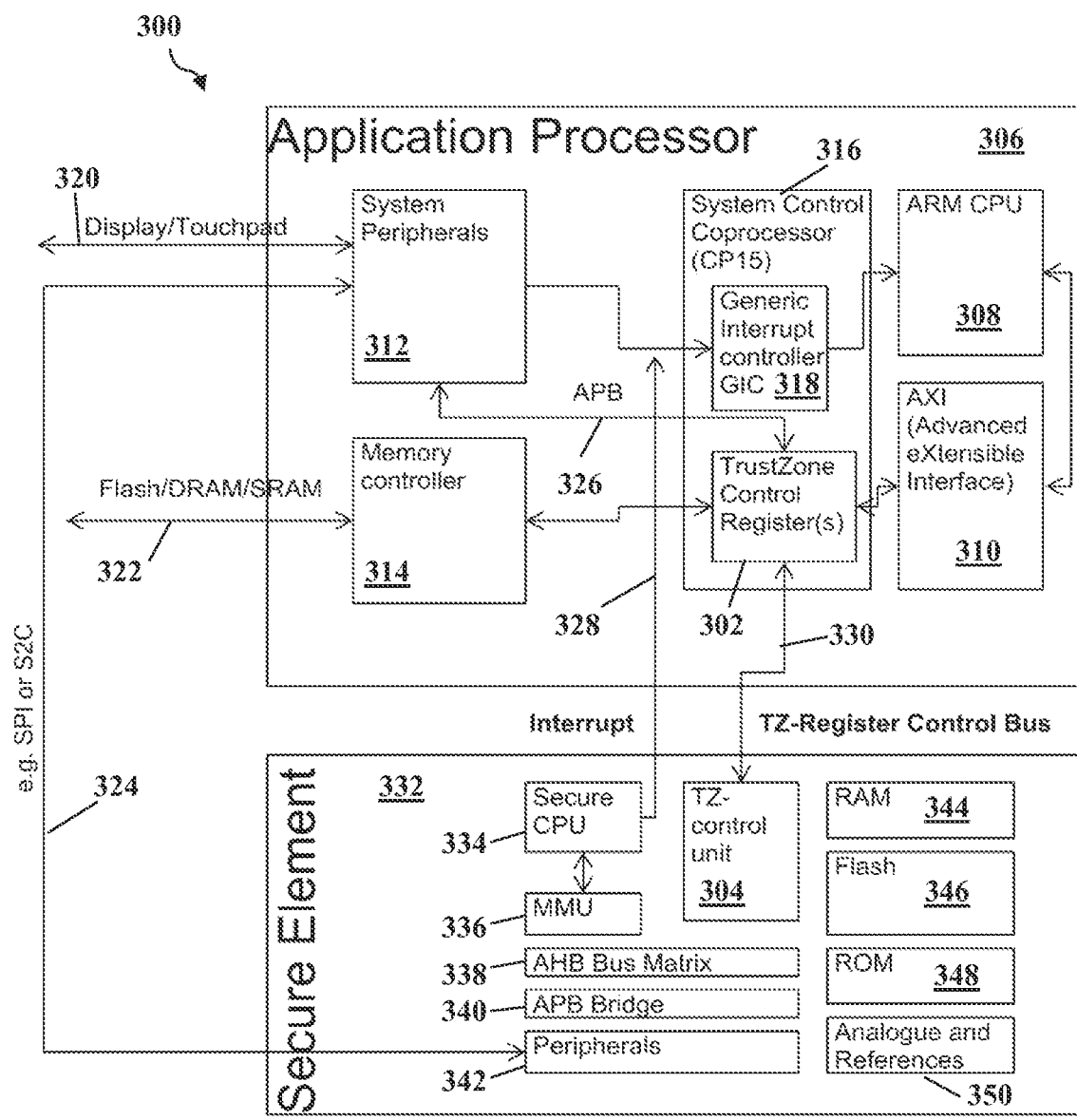
FIG. 3 shows an illustrative embodiment of a system architecture.

FIG. 3 shows an illustrative embodiment of a system architecture. The system 300 may for example be embedded in a mobile phone. The system 300 comprises a processing unit, i.e. an application processor, and a secure element. The secure element may set, via a TrustZone control unit 304, a TrustZone control register 302 in a system control coprocessor 316 (i.e. an application controller) to a value indicative of a secure access mode. In this secure access triode, the TrustZone mechanism assures that the access to the user interfaces through the system peripherals unit is restricted.

In prior art systems, the TrustZone control is typically performed by a TrustZone driver residing in a part of the application controller that belongs to the non-secure world. In accordance with the present disclosure, the TrustZone control unit 304 effectively performs the function of the TrustZone driver, i.e. it effectively controls the TrustZone by setting the TrustZone control register 302 to an appropriate value, i.e. a value indicative of the secure access mode. If the TrustZone control register 302 is set to such a value, then the application controller is effectively switched from the non-secure world into the secure world. That is to say, the application controller is effectively switched from the non-secure world into the secure world under the control of the secure element. Since the TrustZone driver function, or at least all security-critical parts thereof, reside in the secure element, they are adequately protected, and consequently it may be prevented that said TrustZone driver function or its security-critical parts are manipulated in order to open doors for attacks. The TrustZone driver function may for example be embodied as a computer program that resides in a non-volatile memory unit of the secure element. In the secure access mode, I/O transactions over the so-called Advanced Peripheral Bus 326 (APB) may for instance be rejected by the application controller if they are initiated by instructions that are not comprised in an application which is being executed or supported by the secure element.

It is noted that the application controller may contain more than one TrustZone control register, which allows for a more detailed control of specific TrustZone functions, for example. Furthermore, the secure element may set the value of the TrustZone control register of the application controller directly via dedicated hardware-based control signals which cannot be interrupted or changed by the application processor. This establishes that the secure element may effectively behave as a master device during the execution of the application. In particular, if the application has been installed in the secure element and the secure element executes said application and controls its input and/or output in accordance with the present disclosure, a relatively large security improvement may be achieved.

As soon as the application has been executed, e.g. as soon as a payment transaction has been carried out, the secure element may release the Trustzone control register and give back control to the application controller. In this way, a negative impact of the presently disclosed access control function on the processing speed of the whole system may be minimized.

Furthermore, any software used in the secure access mode, in particular the user interface control program, may be checked by the secure element in advance of a switchover to said mode, in order to prevent execution of compromised code. Alternatively or in addition, the secure element may upload software, in particular the user interface control program, to the application controller before switching the application controller to the secure access mode. Both measures may further improve the security of the system. Furthermore, the secure element may verify the integrity of the user interface access control hardware comprised in the processing unit.

The skilled person will appreciate that, although the above-described embodiments have been illustrated with reference to the ARM TrustZone technology, similar technologies may equally well be used to implement the embodiments. For example, the principles underlying the above-described embodiments may equally be applied to data processing devices based on an Intel® architecture comprising so-called Software Guard Extensions (SGX), which allow an application to instantiate a protected container, referred to as an enclave. It is therefore envisaged that, in accordance with the present disclosure, the restricted access to the user interface may also be realized by activating a secure access mode based on an Intel® SGX mechanism, which mechanism subsequently assures said restricted access.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 data processing device
102 processing unit
104 secure element
106 user output interface
108 user input interface
200 data processing device
202 processing unit
204 user interface access controller
300 system architecture
302 TrustZone control register
304 TrustZone control unit
306 application processor
308 ARM central processing unit
310 AXI (Advanced eXtensible Interface)
312 system peripherals
314 memory controller
316 system control coprocessor
318 generic interrupt controller
320 connection to display/touchpad
322 connection to Flash/DRAM/SRAM
324 interface, for example SPI or S2C
326 APB (Advanced Peripheral Bus)
328 interrupt
330 TrustZone-register control bus
332 secure element
334 secure central processing unit
336 memory management unit
338 AHB bus matrix
340 APB bridge
342 peripherals
344 random access memory
346 Flash memory
348 read-only memory
350 analogue system components and references

The invention claimed is:

1. A data processing device configured to execute an application, the data processing device comprising:
   a processing unit comprising a user interface access controller that is configured to control access to both a user input interface and a user output interface, wherein the access to the user input interface is restricted by setting at least one control register in the processing unit to a value indicative of a secure access mode, and the processing unit further comprises a plurality of TrustZone control registers, each TrustZone control register configured to control a respective TrustZone function;
   a secure element configured to control the user interface access controller in the secure access mode, wherein the secure element is further configured to load a user interface access control program into the processing unit before switching the user interface application controller to the secure access mode and cause the user interface access controller in the processing unit to restrict access to the user input interface and the user output interface during execution of the application in the secure access mode, a security driver function resides in the secure element, and the secure element further comprises a TrustZone control unit configured to control the plurality of TrustZone control registers in the processing unit in the secure access mode.

2. The data processing device as claimed in claim 1, wherein restricting the access to the user input interface and the user output interface comprises:
   restricting the access to the user input interface and the user output interface to instructions comprised in said application.

3. The data processing unit as claimed in claim 1, wherein the secure element comprises an integrated circuit in which the application has been installed.

4. The data processing unit as claimed in claim 1, wherein the secure element is further configured to cause the processing unit to revoke the restriction of the access after the application has been executed.

5. The data processing device as claimed in claim 1, wherein the secure element is further configured to verify integrity of the user interface access controller.

6. The data processing device as claimed in claim 1, wherein the secure element is integrated into the processing unit.

7. The data processing device as claimed in claim 1, wherein the data processing device is embedded in a mobile phone.

8. The data processing device as claimed in claim 1, wherein the TrustZone control unit is a non-volatile memory unit of the secure element.

9. A method for executing an application in a data processing device comprising a user interface access controller, the method comprising:
- controlling access, with the user interface access controller, to both a user input interface and a user output interface, comprised in the data processing;
- controlling the user interface access controller in a secure access mode, with a secure element;
- restricting access to the user input interface by setting at least one control register in a processing unit to a value indicative of a secure access mode device, wherein the processing unit comprises a plurality of TrustZone control registers, each TrustZone control register configured to control a respective TrustZone function;
- loading, with the secure element, a user interface access control program into the processing unit before switching the user interface application controller to the secure access mode;
- causing the user interface access controller in the processing unit to restrict the access to the user input interface and the user output interface during execution of the application in the secure access mode, wherein a security driver function resides in the secure element, and the secure element further comprises a TrustZone control unit configured to control the plurality of TrustZone control registers in the processing unit in the secure access mode; and
- receiving input data from the user input interface and sending output data to the user output interface.

10. The method as claimed in claim 9, wherein restricting the access further comprises:
- restricting the access to the user input interface and the user output interface to instructions comprised in said application.

11. The method as claimed in claim 9, wherein the secure element further causes the processing unit to revoke the restriction of the access after the application has been executed.

12. The method as claimed in claim 9, wherein the secure element further verifies integrity of the user interface access controller.

13. A non-transitory computer readable medium comprising a program of instructions to carry out a method for executing an application in a data processing device comprising a user interface access controller, the non-transitory computer readable medium comprising:
- instructions for controlling access, with the user interface access controller, to both a user input interface and a user output interface, comprised in the data processing device;
- instructions for controlling the user interface access controller in a secure access mode, with a secure element;
- instructions for restricting access to the user input interface by setting at least one control register in a processing unit to a value indicative of a secure access mode, wherein the processing unit comprises a plurality of TrustZone control registers, each TrustZone control register configured to control a respective TrustZone function;
- instructions for loading, with the secure element, a user interface access control program into the processing unit before switching the user interface application controller to the secure access mode;
- instructions for causing the user interface access controller in the processing unit to restrict the access to the user input interface and the user output interface during execution of the application in the secure access mode, wherein a security driver function resides in the secure element, and the secure element further comprises a TrustZone control unit configured to control the plurality of TrustZone control registers in the processing unit in the secure access mode; and
- instructions for receiving input data from the user input interface and sending output data to the user output interface.

* * * * *